United States Patent [19]
Sakai

[11] Patent Number: 5,877,870
[45] Date of Patent: Mar. 2, 1999

[54] IMAGE TRANSMISSION CONTROL METHOD FOR FACSIMILE APPARATUS

[75] Inventor: Kaneyuki Sakai, Tokyo, Japan

[73] Assignee: Mitsubishi Denki Kabushiki Kaisha, Tokyo, Japan

[21] Appl. No.: 607,667

[22] Filed: Feb. 27, 1996

[30] Foreign Application Priority Data

Mar. 2, 1995 [JP] Japan ................................. 7-043033

[51] Int. Cl.⁶ ............................... H04N 1/00; H04N 1/36
[52] U.S. Cl. ........................... 358/438; 358/434; 358/412
[58] Field of Search .................... 358/438, 435, 358/434, 436, 440, 468, 412, 409, 405, 439; 375/222, 225, 231; 379/100.17, 100.16, 100.15; 370/522, 525, 526, 465

[56] References Cited

U.S. PATENT DOCUMENTS

| | | | |
|---|---|---|---|
| 4,583,124 | 4/1986 | Tsuji et al. | 358/412 |
| 4,733,303 | 3/1988 | Koshiishi | 358/400 |
| 4,734,780 | 3/1988 | Iwata et al. | 358/435 |
| 5,173,786 | 12/1992 | Nakagawa | 358/438 |
| 5,303,066 | 4/1994 | Kawaguchi | 358/434 |
| 5,353,125 | 10/1994 | Nakagawa | 358/435 |
| 5,585,938 | 12/1996 | Imamura | 358/434 |
| 5,661,568 | 8/1997 | Ueno | 358/412 |
| 5,696,599 | 12/1997 | Tiso | 358/434 |

FOREIGN PATENT DOCUMENTS

| | | |
|---|---|---|
| 0412723 | 2/1991 | European Pat. Off. . |
| 4036098 | 5/1991 | Germany . |
| 5219334 | 8/1993 | Japan . |
| 5219335 | 8/1993 | Japan . |

*Primary Examiner*—Kim Yen Vu
*Assistant Examiner*—Cheukfan Lee
*Attorney, Agent, or Firm*—Rothwell, Figg, Ernst & Kurz

[57] ABSTRACT

An image transmission control method for a facsimile apparatus reduces procedures before and after the sending of an image signal to require less time for the transmission of the image signal, thus improving a network utilization efficiency. The transmission side, when receiving a CED signal transmitted from the reception side, sends a particular tone signal to reduce the procedures before and after the sending of an image signal. NSF, NSS, EOP and MCF signals are communicated between the transmission side and the reception side at a high rate. These signals have a shorter preamble. A suitable communication rate is determined based on the results of learning by use of the previous communication rate and an internally provided model. Whether the reduced procedures are used is also determined from transmission conditions.

12 Claims, 4 Drawing Sheets

| COMMUNICATION RATE | Nc > 0 | Nc = 0 | Nc < 0 |
|---|---|---|---|
| 14400bps | +2 | +2 | 1/4 |
| 12000bps | -1 | -1 | -1 |
| 9600bps | -1 | -2 | -2 |
| 7200bps | 1/2 | -4 | -4 |
| 4800bps | 1/4 | -8 | -8 |
| 2400bps | 1/8 | -16 | -16 |
| CARRIER CUT | 1/8 | -16 | -16 |

Fig. 5

IMAGE TRANSMISSION CONTROL METHOD FOR FACSIMILE APPARATUS

BACKGROUND OF THE INVENTION

1. Field of the Invention

The present invention relates to an image transmission control method, and more particularly, to an image transmission control method for a facsimile apparatus having a means for executing transmission procedures in a shorter time in order to reduce a time required for communication.

2. Description of the Related Art

Figure 1:
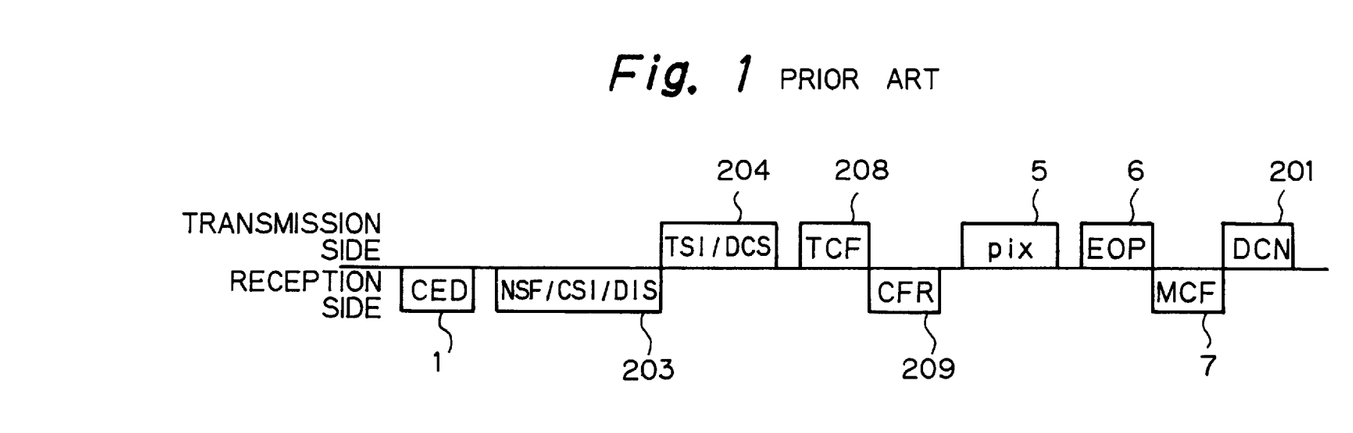
FIG. 1 is a diagram for explaining a communication procedure according to the prior art image transmission control method for a facsimile apparatus.

FIG. 1 shows a diagram explaining a basic communication protocol applied to communications between transmitting and receiving facsimile apparatus in accordance with ITU-T Recommendation. Referring specifically to FIG. 1, signals sent between the transmitting side and the receiving side during a facsimile transmission include a CED signal 1 serving as a called station identification signal sent from the receiving side over a network; signals NSF, CSI, DIS generally designated by 203 for respectively declaring a non-standard function, a receiving capability and the telephone number of a called station, i.e., the receiving side; a TSI signal for transmitting the telephone number of the transmitting side and a DCS signal for setting a transmission function, together designated by 204; a TCF signal 208 for continuously sending "0" for 1.4 seconds at an image signal transmission rate specified by a calling terminal, i.e., the transmitting side to determine whether or not the specified image signal transmission rate is appropriate; a CFR signal 209 indicating that the TCF signal 208 has been correctly received; a pix signal 5 for delivering image signal data; an EOP signal 6 indicating that the last page has been sent; an MCF signal 7 indicating that the immediately previous page has been received without errors; and a DCN signal 201 for declaring that the communication has been completed and that the network connection is disconnected.

If the TCF signal 208 cannot be correctly received due to a bad network condition, the receiving side sends an FTT signal instead of the CFR signal 209 which would otherwise be transmitted to the transmitting side. In response, the transmitting side utilizes the TSI/DCS signal 204 to inform the receiving side of a new transmission rate and then sends the TCF signal 208. This procedure is repeated until the CFR signal 209 is returned from the receiving side.

Figure 2:
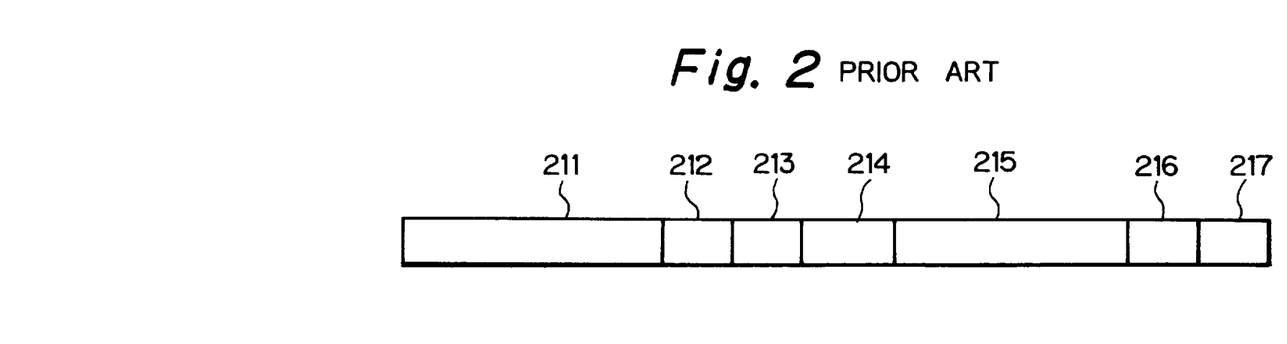
FIG. 2 is a diagram for explaining the HDLC frame constituting respective signals in the prior art image transmission control method for a facsimile apparatus.

FIG. 2 is a diagram explaining a high level data link control (HDLC) frame constituting the above-mentioned respective signals. In FIG. 2, the HDLC frame includes a preamble 211 consisting of sequential one-second flag codes; an address code 212; a control code 213; a facsimile control field 214; a facsimile information field 215; a frame check sequence 216; and one or more flags 217. The HDLC frame, composed of these elements, is generally sent at a transmission rate of 300 bps.

Next, the operation of the facsimile apparatus will be described with reference again to FIG. 1. In FIG. 1, the receiving side, upon receiving a call, sends a CED signal indicating that this is a non-audio terminal. The CED signal is a single tone signal at 2100 Hz which is generated for more than 2.6 seconds and less than 4.0 seconds.

In continuation, the receiving side sends the NSF signal used for identifying an option which may be different depending on respective manufacturers, a CSI signal including a country code, a telephone number, and so on, and a DIS signal used for identifying a standard function in accordance with ITU-T Recommendation. These signals are each formatted in accordance with the HDLC frame shown in FIG. 2. Also, signals TSI, DCS, CFR, EOP, MCF, DCN are likewise formatted in accordance with the HDLC frame. The HDLC frame sends binary code information after approximately one second of preamble 211 for establishing synchronization between modems (modulation-demodulation units) of the transmitting side and the receiving side. The binary code information includes substantially fixed information such as the address code 212, control code 213, and flag 217 as well as rather variable information such as the facsimile control field 214 indicating the kind of control signal, the facsimile information field 215 indicating detailed contents thereof, and the frame check sequence 216 for checking the frame. Also, when a plurality of HDLC frames are sequentially sent such as a sequence of NSF/CSI/DIS signals, these HDLC frames share the preamble 211.

In response to the NSF/CSI/DIS signals 203 sent from the receiving side, the transmitting side determines the capabilities of the respective functions of the receiving side, and informs the receiving side of the determined capabilities through the TSI/DCS signal 204.

Subsequently, the TCF signal 208 is sent for about 1.5 seconds to prepare the receiving side to receive a high rate signal. When conditions are appropriate the receiving side returns the CFR signal 209 to enable transmission of image data (pix signal 5) at a high rate to be proceeded with. When conditions are not appropriate, the reception side returns the FTT signal to step down the signal rate of the image data signal (for example, from 14.4 KBPS to 12 KBPS), and the above-mentioned procedure is repeated by sending a further TCF signal 208.

After the pix signal 5 has been transmitted from the transmitting side and received by the receiving side, a post-procedure protocol is entered. First, the transmitting side sends the EOP signal 6 indicative of the last page. The receiving side, in response to the EOP signal 6, returns the MCF signal 7 to the transmitting side which next sends the DCN signal 210 informing the receiving side of a disconnected network, thus completing the communication.

Since a conventional facsimile apparatus is constituted as described above, it takes approximately 15 to 16 seconds to complete the procedure required to send an image signal (pix signal 5) after a call has been answered. Assuming that an image signal is sent at a transmission rate of 14.4 KBPS, the procedure requires a time period of two to three times that of transmission of a document (pix signal 5), i.e., the original purpose. In other words, network utilization efficiency is extremely low, resulting in increased communication costs.

Also, when a network condition is not appropriate for transmission, the transmission rate is changed until the CFR signal 209 is returned from the receiving side in order to determine an appropriate transmission rate. However, approximately five seconds are required for the procedure each time the transmission rate is changed.

Japanese Patent Public Disclosure No. 5-219334 (1993) has proposed a solution to the above-mentioned problems. Specifically, a transmitting side sends a tone signal to a receiving side to reduce the number of procedures required to transmit an image to the receiving side. However, the disclosed solution does not address the reduction of procedures required after the transmission of an image signal (pix signal 5) nor to the provision of a shorter preamble in the HDLC frame. Since this solution doe not reduce the time required to execute the procedures before and after the transmission of the image signal (pix signal 5), the network utilization efficiency cannot be improved sufficiently.

SUMMARY OF THE INVENTION

The present invention has been made to solve the problems mentioned above, and it is an object of the invention to provide a facsimile apparatus which is capable of reducing the amount of time required to execute procedures associated with the transmission of image signals, improving network utilization efficiency, and saving on communication costs, while maintaining compatibility with conventional facsimile apparatus in conformity with ITU-T Recommendation.

According to a first aspect of the present invention, there is provided an image transmission control method for a facsimile apparatus comprising the steps of sending a predetermined identification tone signal from a transmitting side when receiving a receiving side identification signal sent from a receiving side, sending from the receiving side a non-standard function identification signal for identifying a non-standard function provided for the receiving side, when the receiving side receives the predetermined identification tone signal, sending, at a high rate from the transmitting side, a transmission end signal for identifying the completion of the transmission when the transmitting side has sent an image information signal in accordance with the non-standard function identification signal, the transmission end signal having a shorter preamble, and sending, at a high rate from the receiving side, a correct reception signal for identifying correct reception of the image signal, the correct reception signal having a shorter preamble.

The image transmission control method for a facsimile apparatus may further comprise the steps of determining from the non-standard function identification signal sent from the receiving side whether the receiving side is capable of identifying the predetermined tone signal, sending the identification tone signal from the transmitting side when the receiving side is determined to be capable of identifying the predetermined tone signal, and communicating between the transmitting side and the receiving side through a predetermined procedure different from the procedure executed when the identification tone is sent, when the transmitting side does not send the identification tone.

The receiving side may send the non-standard function identification signal having a shorter preamble.

According to a second aspect of the present invention, there is provided an image transmission control method for a facsimile apparatus comprising the steps of determining, from a non-standard function identification signal sent from a receiving side, a communication rate of the receiving side, and sending an identification tone in accordance with the determined communication rate to the receiving side, sending, at a high rate from the transmitting side, a transmission end signal for identifying the completion of the transmitting when the transmission side has sent an image information signal at the communication rate, the transmission end signal having a shorter preamble, and sending at a high rate from the receiving side a correct reception signal for identifying correct reception of the image signal, the correct reception signal having a shorter preamble.

According to a third aspect of the present invention, there is provided an image transmission control method for facsimile apparatus comprising the steps of performing learning based on previous communication rates at which a transmitting side has communicated with a receiving side and on an internally provided model, when the transmitting side receives a non-standard function identification signal sent from the receiving side, sending an identification tone corresponding to an updated communication rate in accordance with such learning to the receiving side, and transmitting from the transmitting side an image information signal at the updated communication rate.

The transmitting side, when sending the identification tone signal, may communicate with the receiving side through shorter communication procedures, executed before and after sending the image information signal, than the case where the transmitting side does not send the identification tone signal.

The predetermined identification tone signal may comprise a combination of a plurality of tone signals at different frequencies.

According to the image transmission control method for a facsimile apparatus of the present invention, the transmitting side sends a predetermined identification tone signal, the receiving side sends a non-standard function identification signal for identifying a non-standard function the receiving side has, upon receiving the predetermined identification tone signal, and the transmitting side sends an image information signal in accordance with the non-standard function identification signal to omit a pre-procedure of the image transmission control. A transmission completion signal and a correct reception signal, which are provided with a shorter preamble, are sent by the transmitting side and the receiving side, respectively, at a high rate after the transmission of the image information signal has been completed. In this way, a time required to execute a procedure for the image transmission control can be reduced, while maintaining compatibility with facsimiles conforming to ITU-T Recommendation.

Also, the transmitting side sends an identification tone signal when determining that the receiving side is capable of identifying the predetermined identification tone signal, and the transmitting side and the receiving side automatically select a reduced procedure for the image transmission control and mutually communicate associated signals at a high rate. When the transmitting side does not send the identification tone signal, communication is performed through normal procedures.

Further, the receiving side sends the non-standard function identification signal having a shorter preamble to further reduce the time required to execute the procedure for the image transmission control.

Further, the transmitting side determines a communication rate of the receiving side from the non-standard function identification signal, sends to the receiving side an identification tone in accordance with this communication rate, and sends an image information signal at the determined communication rate. The transmission completion signal and the correct reception signal, which have a shorter preamble, are sent by the transmitting side and the receiving side, respectively, at a high rate.

Further, the transmitting side provides the receiving side with an identification tone corresponding to a communication rate updated by a learning process based on past communication rates, at which the transmitting side has communicated with the receiving side, and on an internally provided model, and the transmitting side sends an image information signal at the updated communication rate, so that the transmitting side can communicate with the receiving side at an appropriate communication rate.

Further, since the transmitting side sends an identification tone signal, and communicates with the receiving side through shorter communication procedures before and after the sending of an image information signal than the case where the identification tone signal is not sent, the transmitting side completes communications with the receiving side in a shorter time.

Further, since the transmitting side sends a predetermined identification tone signal including a combination of a plurality of tone signals at different frequencies, the influence of noise can be reduced. Also, a plurality of information may be included in the identification tone signal.

DESCRIPTION OF THE PREFERRED EMBODIMENTS

An image transmission control method for facsimile apparatus according to the present invention will hereinafter be described in connection with its embodiments.

Figure 3:
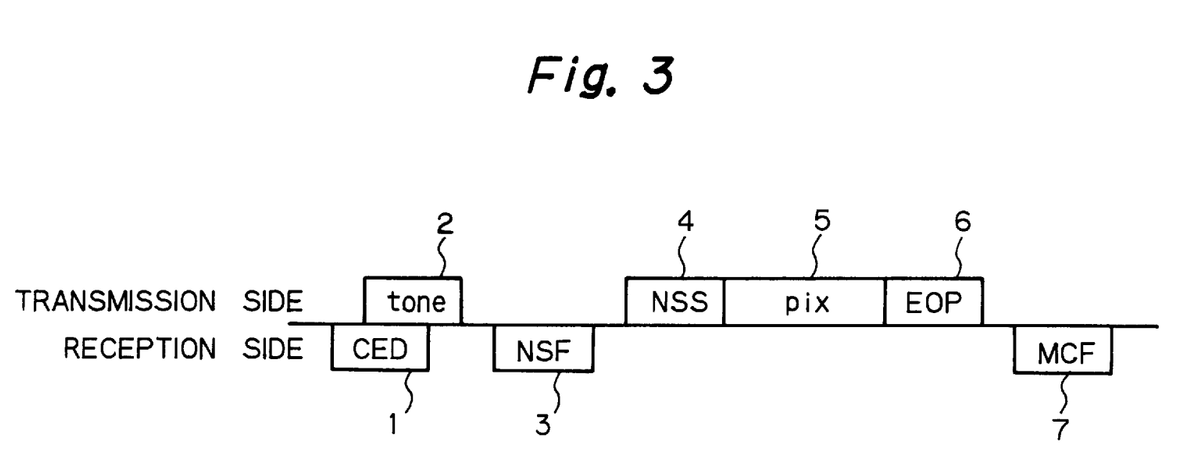
FIG. 3 is a diagram for explaining a communication procedure used in an image transmission control method for a facsimile apparatus according to the present invention.

FIG. 3 is a diagram for explaining a first embodiment of the image transmission control method for a facsimile apparatus according to the present invention. Referring specifically to FIG. 3, a communication procedure in accordance with the image transmission control method of the present invention also employs CED and pix signals 1, 5 similar to those used in the conventional facsimile apparatus transmission mode shown in FIG. 1. In addition, the communication procedure utilizes an identification tone signal 2 sent from the transmitting side; an NSF signal 3 which is a non-standard function signal sent from the receiving side after the tone signal 2, serving as an identification tone signal, is detected; and an NSS signal 4 and an EOP signal 6 having similar formats to conventional signals and sent at a high rate. The NSS signal 4 is a non-standard function setting signal which is sent when a facsimile apparatus on the transmitting side is made by the same manufacturer as that on the receiving side. If the facsimile apparatus on the transmitting side is made by a different manufacturer, a TSI/DCS signal 204 is sent at a high rate.

Next, the operation will be described with reference again to FIG. 3. The transmitting side sends the tone signal 2, multiplexed with the CED signal 1 sent by the receiving side upon answering the call, to the receiving side in order to inform the receiving side that the communication is to be performed by a high speed procedure. The tone signal 2 is composed of dual tones at 350 Hz and 2100 Hz to prevent erroneous detection.

The receiving side, upon detecting the tone signal 2, sends an NSF signal 3. It should be noted that in this embodiment, both CSI and DIS signals (FIG. 1) defined in ITU-T Recommendation are removed so that only the NSF signal 3 is used, and moreover the NSF signal 3 includes only a minimal necessary amount of information.

The transmitting side, after receiving the NSF signal 3, returns the NSS signal 4 (corresponding to the TSI/DCS signal 204 (FIG. 1) in ITU-T Recommendation) as a response thereto, at a high rate, similarly to the transmission of the pix signal 5 which is image data. It should be noted that the NSS signal 4 is formatted in the HDLC frame since this is a procedure signal. Further, in this signal, the preamble 211 in the HDLC frame is reduced from 1 second to 0.5 seconds.

In ITU-T Recommendation, the TCF signal 208 and CFR signal 209 are to be communicated next. However, in this embodiment, upon entering the high speed procedure, the transmission and reception are assumed to be performed at the highest communication rate. Thus, training for high rate signals is omitted, and the TCF signal 208 and CFR signal 209 are removed.

If an error occurs in the pix signal 5 during the execution of the procedure, a re-sending step is performed in accordance with a G3ECM procedure of ITU-T Recommendation. However, in communication with a site linked to a low quality network, the re-sending step often interrupts the main procedure thus hindering the advantageous high speed procedure. A higher efficiency may sometimes be achieved if image data is transmitted in accordance with the conventional procedure of ITU-T Recommendation from the beginning. To solve this problem, this embodiment is provided with a function, later described in detail, to determine from past communication results whether or not the high speed procedure should be entered.

In the post-procedure, the transmitting side sends the EOP signal 6 at a high rate, similarly to the NSS signal 4, with a shorter preamble. When the receiving side sends the MCF signal 7 (which also has a shorter preamble) in response thereto, the communication is terminated without sending the DCN signal (FIG. 1) from the transmitting side.

It should be noted that the conventional NSF signal 203 may be used instead of the NSF signal 3 in the above described procedure. Also, the preamble 211 shown in FIG. 2, which conventionally has a duration of 1 second, may be shortened to reduce the respective signals used in the procedure, thus realizing a reduction in entire communication time. Further, since the identification tone, i.e., the tone signal 2 is composed of a plurality of tones, the identification tone may have a larger amount of information which can be utilized not only to proceed to the reduced procedure, but also to provide more services by additional information. It is also possible to prevent malfunctions caused by other facsimile apparatus using a similar tone or noise interference or the like.

With the configuration described above, the receiving side, when receiving the predetermined tone signal 2 sent from the transmitting side, sends the NSF signal 3. Then, the transmitting side sends the image information signal pix 5 in accordance with the NSF signal 3 to omit the pre-procedure of the image transmission control. After sending pix signal 5, when the transmitting side and the receiving side respectively send the EOP signal 6 and the MCF signal 7 with a shorter preamble at a high rate, the amount of time required for the image transmission control procedure can be reduced to improve the network utilization efficiency as well as to save network cost, while maintaining the compatibility in communication with conventional facsimiles in conformity to ITU-T Recommendation.

A second embodiment of the image transmission control method for a facsimile according to the present invention will next be described. A facsimile apparatus communicates with a first party through conventional communication procedures, wherein the transmitting side determines from the NSF/CSI/DIS signal 203 transmitted from the reception side, shown in FIG. 1, whether or not the receiving side has an identification tone detecting means. If the transmitting side determines that the receiving side does not have identification tone detecting means, the transmitting side again utilizes the conventional procedure for subsequent communication. On the contrary, upon determining that an identification tone can be detected on the receiving side, the transmitting side adds information indicating that the identification tone can be detected to the stored telephone number of the called party. Starting the next communication with this party, the transmission side sends the tone signal 2 including the identification tone and communicates with the called party through the communication procedure shown in FIG. 3, whereby the reduced procedure can be executed even if information about the receiving side is not previously available to the user on the transmitting side.

Next, a third embodiment of the image transmission control method for facsimile apparatus according to the present invention will be described. In the communication procedure utilizing the tone signal 2 which serves as an identification tone, it is assumed that communications are performed at a predetermined communication rate (maximum communication rate). However, if the communication rate is likely to change due to varying network conditions or the like, a procedure for decreasing (adjusting) the communication rate is required since the reduced procedure shown in FIG. 3 is not sufficient to cope with this problem. In order to minimize the intervention of the procedure for decreasing the communication rate, a method of determining the communication rate by a learning function is used.

The learning function has a means for creating for the calling apparatus an evaluation function $E(Vi)(x)$ from the previous communication rate $Vi$ and decision coefficients $N_c$ up to the previous communications and for calculating a new decision coefficient $N_{c1}$ given by $E(Vi)(N_c)$ which is derived from the evaluation function $E(Vi)(x)$ with the decision coefficients $N_c$ up to the previous communications used as an argument. The communication rate $Vi$ for the next communication is determined from the decision coefficient $N_{c1}$. Then, by informing the receiving side of the thus determined communication rate $Vi$ through the tone signal 2 serving as the identification tone, it is possible to select a maximum communication rate at which communications can be performed through the reduced procedure.

Figure 4:
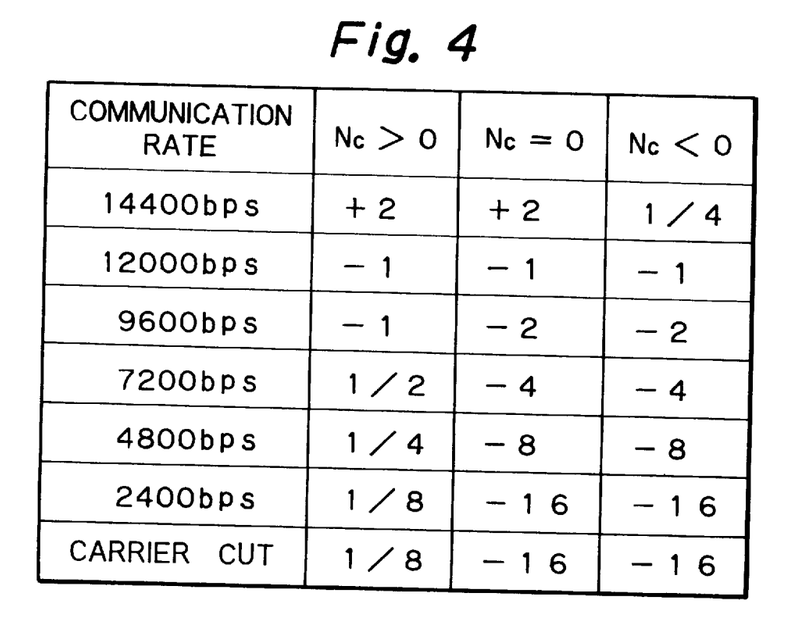
FIG. 4 is a table for showing the relationship between the communication rate, at which a facsimile apparatus on the transmitting side communicates with a facsimile apparatus on the receiving side, and a new decision coefficient $N_{c1}$ calculated from and previous decision coefficients $N_c$.
Figure 5:
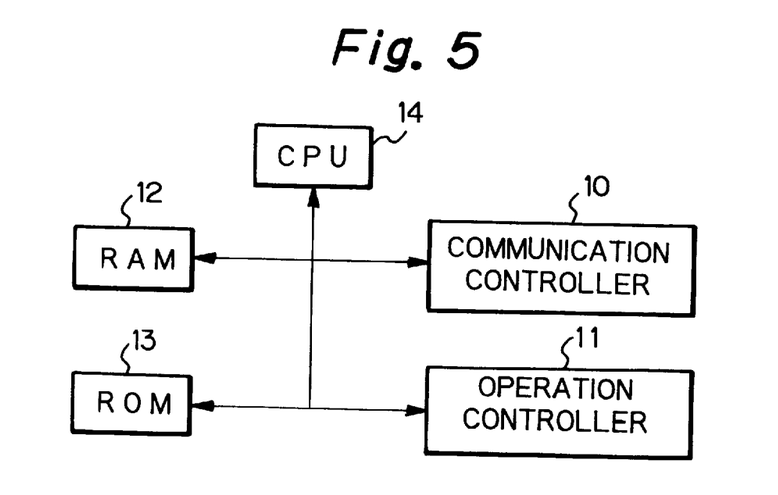
FIG. 5 is a block diagram showing the configuration of a transmission condition determining means for determining a transmission condition in the image transmission control method for a facsimile apparatus according to the present invention.

FIG. 4 is a table for representing the relationship between the communication rate $Vi$, at which a facsimile apparatus on the transmitting side communicates with a facsimile apparatus on the receiving side, and the new decision coefficient $N_{c1}$ calculated from the previous decision coefficient $N_c$. FIG. 5 is a block diagram showing the configuration of a transmission condition determining means for determining the communication condition for a facsimile apparatus. In FIG. 5, the transmission condition determining means includes a communication controller 10 for controlling communication procedures; an operation controller 11 for controlling the operation of an associated apparatus; a RAM 12 for storing dial data, the decision coefficient $N_c$, and so on; a ROM 11 for storing operation conditions; and a central processing unit (CPU) 14.

The operation of the transmission condition determining means shown in FIG. 5 will be next described. The learning function determines, prior to communication, whether communication is performed through the high speed procedure (reduced procedure) or through the low speed procedure (normal procedure) in accordance with ITU-T Recommendation, depending on the opposite party, so as to select a maximally possible communication rate. While dial data, such as one-touch dial data, normally comprises a telephone number of a called party, the name of the called party, the presence or absence of optional functions, and so on, the present embodiment additionally provides the decision coefficient $N_c$ for determining whether the high speed procedure should be executed. An algorithm for calculating the determining coefficient $N_c$ will be explained below with reference to FIG. 6.

Figure 6:
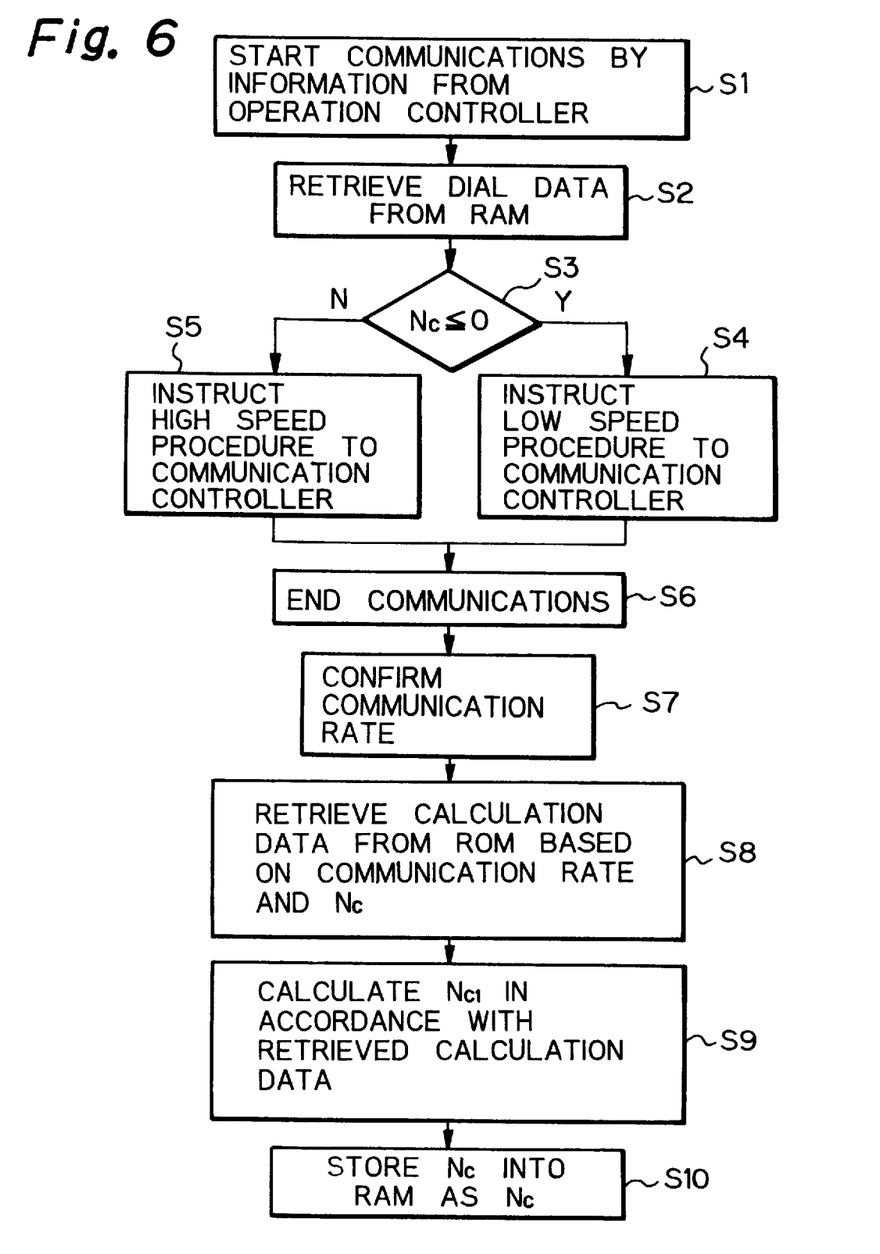
FIG. 6 is a flow chart representing a procedure for the transmission condition determining means to determine the decision coefficient $N_c$.

FIG. 6 is a flow chart representing a procedure for the communication condition determining means to determine the decision coefficient $N_c$. Specifically, at step S1, communication is started by instructions from the operation controller 11. Then, at step S2, the decision coefficient $N_c$ included in the dial data is retrieved from the RAM 12. The CPU 14 checks the retrieved decision coefficient $N_c$ at step S3, and instructs the communication controller 10 to execute the normal procedure for communication (step S4) when the decision coefficient $N_c$ is equal to or less than zero ($N_c \leq 0$), and otherwise instructs the communication controller 10 to execute the high speed procedure shown in FIG. 3 for the communications and to perform communication at the previous communication rate $Vi$ (step S5). It is assumed herein that an initial value for the decision coefficient $N_c$ is set to "0" and may vary in the range of −127 to +126 (which are values determined by experiments or the like). After the completion of the communications (step S6), the current communication rate $Vi$ is confirmed (step S7). Then, at step S8, the CPU 14 retrieves operation data from the ROM 13, calculates the new decision coefficient $N_{c1}$ as shown in FIG. 4 by the evaluation function $E(Vi)(x)$ using the current communication rate $Vi$ and the decision coefficient $N_c$ (step S9), and stores the new decision coefficient $N_c$ as the decision coefficient $N_c$ for the current communicated party into the RAM 12 (step S10) in preparation for subsequent communication.

It should be noted that while the identification tone is used to determine whether the reduced procedure can be used or not in the foregoing embodiment, the identification tone may also be used to select an optimal communication rate $Vi$. In this case, the calling side may inform the receiving side of an optimal communication rate through the tone signal 2 serving as the identification tone, thereby enabling communications at this communication rate. Further, if the evaluation function $E(Vi)(x)$ is selected to cover the whole range of communication rates, a larger number of parameters will be required. In this event, the calculation of the decision coefficient $N_{c1}$ can be more correctly and efficiently made if the evaluation function $E(Vi)(x)$ is changed in accordance a maximum communication rate $Vi$ on the receiving side.

As described above, according to the present invention, in the image transmission control method for a facsimile apparatus, the receiving side sends a non-standard function identification signal upon receiving a predetermined identification tone signal sent from the transmitting side, and the transmitting side sends an image information signal in accordance with the non-standard function identification signal to omit a pre-procedure of the image transmission control. A transmission completion signal and a correct reception signal, which are provided with a shorter preamble, are sent by the transmitting side and the receiving side, respectively, at a high rate after the transmission of the image information signal has been completed. In this way, a time required for executing a procedure for the image transmission control can be reduced, while maintaining the compatibility with facsimile in conformity with ITU-T Recommendation, thereby improving a network utilization efficiency and lowering communication fees.

Also, the transmitting side sends the identification tone signal when determining that the receiving side is capable of identifying the predetermined identification tone signal, and the transmitting side and the receiving side automatically select a reduced procedure for the image transmission control and mutually communicate associated signals at a high rate. When the transmitting side does not send the identification tone, the communications are performed through a normal procedure. Thus, it is possible to realize an efficient network utilization even if the user does not know the capability for reduced procedure for the image transmission control of the facsimile apparatus.

Further, the time required to execute the procedure for the image transmission control is further reduced, when the receiving side sends the non-standard function identification signal having a shorter preamble.

Further, the transmitting side sends to the receiving side the identification tone in accordance with a communication rate of the receiving side determined from the non-standard function identification signal, and sends an image information signal at the determined communication rate to omit a pre-procedure of the image transmission control. A transmission completion signal and a correct reception signal, which are provided with a shorter preamble, are sent by the transmitting side and the receiving side, respectively, at a high rate after the transmission of the image information signal has been completed. In this way, a time required for executing a procedure for the image transmission control can be reduced, thereby improving a network utilization efficiency even if the user does not know the capability for reduced procedure for the image transmission control of the facsimile apparatus.

Further, the transmitting side provides the receiving side with an identification tone corresponding to a communication rate updated by a learning process based on previous communication rates, at which the transmitting side has communicated with the receiving side, and on an internally provided model. Then, when the transmitting side sends an image information signal at the updated communication rate, the image signal can be transmitted at a rate suitable for the functions of the receiving side and the communication rate on the network.

Further, since the transmitting side sends the identification tone signal, and communicates with the receiving side through shorter communication procedures before and after the sending of an image information signal than the case where the identification tone signal is not sent, the transmitting side completes communications with the receiving side in a shorter time, thereby improving a network utilization efficiency even if the user does not know the reduced procedure for the image transmission control of the facsimile apparatus.

Further, since the transmitting side sends the predetermined identification tone signal including a combination of a plurality of tone signals at different frequencies, the procedure for the image transmission control can be omitted by the predetermined identification tone signal. Even if a tone signal at a certain frequency within the plurality of tone signals at different frequencies is influenced by noise or the like, the transmission side can reliably transmit the remaining tone signals to the receiving side.

What is claimed is:

1. An image transmission control method for facsimile apparatus comprising the steps of:

sending a predetermined identification tone signal from a transmitting side upon receiving an identification signal sent from a receiving side;

sending from the receiving side a non-standard function identification signal for identifying a non-standard function provided for the receiving side, when the receiving side receives said predetermined identification tone signal;

sending at a high rate from the transmitting side a transmission end signal for identifying the completion of the transmission when the transmitting side has sent an image information signal in accordance with said non-standard function identification signal, said transmission end signal having a shortened preamble; and sending at a high rate from the receiving side a correct reception signal for identifying correct reception of said image information signal, said correct reception signal having a shortened preamble.

2. An image transmission control method for a facsimile apparatus according to claim 1, further comprising the steps of:

determining from the non-standard function identification signal sent from the receiving side whether the receiving side is capable of identifying the predetermined identification tone signal;

sending said predetermined identification tone signal from the transmitting side when the receiving side is determined to be capable of identifying the predetermined identification tone signal; and communication between the transmitting side and the receiving side through a predetermined procedure different from the procedure executed when said identification tone signal has been sent, when the transmitting side does not send said identification tone signal.

3. An image transmission control method for facsimile apparatus according to claim 2, wherein said predetermined identification tone signal comprises a combination of a plurality of tone signals at different frequencies.

4. An image transmission control method for facsimile apparatus according to claim 1, wherein the reception side sends the non-standard function identification signal having a shorter preamble.

5. An image transmission control method for facsimile apparatus comprising the steps of:

performing a learning process based on previous communication rates at which a transmitting side has communicated with a receiving side and on an internally provided model, when the transmitting side receives a non-standard function identification signal sent from the receiving side to obtain an updated communication rate;

sending an identification tone signal corresponding to said updated communication rate to the receiving side; and transmitting from the transmitting side an image information signal at said updated communication rate.

6. An image transmission control method for facsimile apparatus comprising the steps of:

determining, from a non-standard function identification signal sent from a receiving side, a communication rate of the receiving side, and sending from a transmitting side an identification tone signal in accordance with the determined communication rate to the receiving side;

sending at a high rate from the transmitting side a transmission end signal for identifying the completion of the transmission when the transmitting side has sent an image information signal at said communication rate, said transmission end signal having a shortened preamble; and sending at a high rate from the receiving side a correct reception signal for identifying correct reception of said image information signal, said correct reception signal having a shortened preamble.

7. An image transmission control method for facsimile apparatus comprising the steps of:

determining, from a non-standard function identification signal sent from a reception side, a communication rate of the reception side, and sending an identification tone signal in accordance with the determined communication rate to the reception side;

sending at a high rate from the transmission side a transmission end signal for identifying the completion of the transmission when the transmission side has sent an image information signal at said communication rate, said transmission end signal having a shorter preamble; and sending at a high rate from the reception side a correct reception signal for identifying correct reception of said image information signal, said correct reception signal having a shorter preamble.

8. An image transmission control method for facsimile apparatus according to claim 7, wherein said predetermined identification tone signal comprises a combination of a plurality of tone signals at different frequencies.

9. An image transmission control method for facsimile apparatus comprising the steps of:

performing learning based on previous communication rates at which a transmission side has communicated with a reception side and on an internally provided model, when the transmission side receives a non-standard function identification signal sent from the reception side;

sending an identification tone signal corresponding to an updated communication rate in accordance with the learning to the reception side; and transmitting from the transmission side an image information signal at said updated communication rate.

10. An image transmission control method for facsimile apparatus according to claim 9, wherein:

the transmitting side, when sending said identification tone signal, communicates with the receiving side through shortened communication procedures, executed before and after sending the image information signal, than the case where the transmitting side does not send said identification tone signal.

11. An image transmission control method for facsimile apparatus according to claim 10, wherein said predetermined identification tone signal comprises a combination of a plurality of tone signals at different frequencies.

12. An image transmission control method for facsimile apparatus according to claim 9, wherein said predetermined identification tone signal comprises a combination of a plurality of tone signals at different frequencies.

* * * * *